United States Patent
Cushing

[11] Patent Number: 6,018,421
[45] Date of Patent: *Jan. 25, 2000

[54] MULTILAYER THIN FILM BANDPASS FILTER

[76] Inventor: David Henry Cushing, 7131 Quinnfield Wy., Greely, Ontario, Canada, K4P 1B6

[*] Notice: This patent is subject to a terminal disclaimer.

[21] Appl. No.: 08/928,479

[22] Filed: Sep. 12, 1997

Related U.S. Application Data

[63] Continuation-in-part of application No. 08/529,449, Sep. 18, 1995, Pat. No. 5,719,989, which is a continuation-in-part of application No. 08/496,097, Jun. 28, 1995.

[51] Int. Cl.[7] .............. G02B 5/28; G02B 5/10; G02B 5/22
[52] U.S. Cl. ............ 359/589; 359/587; 359/588; 359/885
[58] Field of Search .................. 359/587, 585, 359/586, 589, 885; 385/24

[56] References Cited

U.S. PATENT DOCUMENTS 5,144,498   9/1992   Vincent et al. ................. 359/885
5,719,989   2/1998   Cushing ........................ 359/589

OTHER PUBLICATIONS

Thin Film. Optical Filters, H. A. Macleod, McGraw Hill p. 206–219, 270–276.

*Primary Examiner*—Cassandra Spyrou
*Assistant Examiner*—Audrey Chang
*Attorney, Agent, or Firm*—Neil Teitelbaum & Associates

[57] ABSTRACT

A novel design for producing bandpass filters with essentially square shapes with little or no ripple in the passband zone. Filters are of the all-dielectric type consist of multiple cavities of bandpasses. Quarter wave thick layers of low index material separate all of the cavities from each other. Multiple half-waves may be added to the outer cavity quarter-wave stacks in particular. This invention provides the addition of half wave to some of the inner cavity stacks to remove ripple that would otherwise be present. Together, these additional half wave layers added to the outer and inner cavities sharpen the transition from low transmission to high transmission without unduly adding ripple to the high transmission zone.

9 Claims, 8 Drawing Sheets

| HIGH INDEX QW |
| LOW INDEX QW |
| HIGH INDEX QW |
| LOW INDEX QW |
| HIGH INDEX QW + HALF-WAVE |
| LOW INDEX QW |
| HIGH INDEX HALF-WAVE |
| LOW INDEX QW + HALF-WAVE |
| HIGH INDEX QW |
| LOW INDEX QW |
| HIGH INDEX QW |
| LOW INDEX QW |
| HIGH INDEX QW |

| |
|---|
| SUBSTRATE |
| M layer   CAVITY #1 |
| QW LOW INDEX |
| M layer  CAVITY #2 |
| QW LOW INDEX |
| M layer  CAVITY #3 |
| QW LOW INDEX |
| M layer  CAVITY #4 |
| QW LOW INDEX |
| M layer   CAVITY #5 |
| EMERGENT MEDIUM |

Fig. 1a          Prior Art

| HIGH INDEX QW |
|---|
| LOW INDEX QW |
| HIGH INDEX QW |
| HALF WAVE |
| HIGH INDEX QW |
| LOW INDEX QW |
| HIGH INDEX QW |

Fig. 4 Prior Art

| HIGH INDEX QW |
|---|
| LOW INDEX QW |
| HIGH INDEX QW |
| LOW INDEX QW |
| HIGH INDEX QW + HALF-WAVE |
| LOW INDEX QW |
| HIGH INDEX HALF-WAVE |
| LOW INDEX QW + HALF-WAVE |
| HIGH INDEX QW |
| LOW INDEX QW |
| HIGH INDEX QW |
| LOW INDEX QW |
| HIGH INDEX QW |

Fig. 4a

| QWS #1 |
|---|
| HALF WAVE |
| QWS #2+L+QWS #3 |
| HALF WAVE |
| QWS #4+L+QWS #5 |
| HALF WAVE |
| QWS #6 |

Fig. 5a. Prior Art

MULTILAYER THIN FILM BANDPASS FILTER

This application is a Continuation-in-Part of patent application Ser. No 08/529,449 filed Sep. 18, 1995 now U.S. Pat. No. 5,719,989 which is a Continuation-in-part of application Ser. No. 08/496,097 filed Jun. 28, 1995 now allowed.

FIELD OF THE INVENTION

This invention relates to dielectric bandpass filters, and more particularly to multi-layer multi-cavity structures that reduce transmission ripple in the passband.

BACKGROUND OF THE INVENTION

Optical interference, that modifies the transmitted and reflected intensities of light, occurs with the superposition of two or more beams of light. The principle of superposition states that the resultant amplitude is the sum of the amplitudes of the individual beams. The brilliant colors, for example, which may be seen when light is reflected from a soap bubble or from a thin layer of oil floating on water are produced by interference effects between two trains of light waves. The light waves are reflected at opposite surfaces of the thin film of soap solution or oil.

More importantly, a practical application for interference effects in thin films involves the production of coated optical surfaces. When a film of a transparent substance is deposited on transparent substrate such as glass, for example, with a refractive index which is properly specified relative to the refractive index of the glass and with a thickness which is one quarter of a particular wavelength of light in the film, the reflection of that wavelength of light from the glass surface can be almost completely suppressed. The light which would otherwise be reflected is not absorbed by a non-reflecting film; rather, the energy in the incident light is redistributed so that a decrease in reflection is accompanied by a concomitant increase in the intensity of the light which is transmitted.

Considerable improvements have been achieved in the anti-reflective performance of such films by using a composite film having two or more superimposed layers. Two different materials may be used in fabricating such a composite film, one with a relatively high index of refraction and the other with a relatively low index of refraction. The two materials are alternately deposited to predetermined thickness' to obtain desired optical characteristics for the film. In theory, it is possible with this approach to design multi-layer interference coatings for a great variety of transmission and reflection spectrums. This has led to the development of many new optical devices making use of complex spectral filter structures. Anti-reflection coatings, laser dielectric mirrors, television camera edge filters, optical bandpass filters, and band rejection filters are some of the examples of useful devices employing thin film interference coatings.

One particular type of interference coating is the bandpass filter, which is designed to allow wavelengths within a predetermined range of the desired pass-band to be transmitted, while a range of wavelengths on either side of the pass band are highly reflected. Ideally a bandpass filters should be square in its response; thus, the transition from the rejection regions to the passband should be as rapid as possible, or expressed differently, the slope or transition region should be as steep as possible, while obtaining a pass band region that is uniform having little or no ripple.

A classical three-cavity optical filter, has a transmission ratio of 1% bandwidth to 50% bandwidth of about 1.87. However, it is generally well known that that a filter of this type suffers from substantial ripple. It is also well known that as the filter design is modified to lessen ripple, the aforementioned ratio severely increases and hence the filter is far less square in its transmission response. An embodiment of the filter in accordance with this invention has a 1% to 50% bandwidth ratio of only 1.97, wherein transmission ripple is substantially reduced. Thus the squareness of the optical filter is only compromised minimally.

Multi-cavity filters have been manufactured for more than 40 years, and usual approach of filter designers has been to simply anti-reflect equal length cavity structures to the substrate and the exit medium. However, this approach yields filters with excessive ripple in the passband. In an attempt to obviate this problem, the need to modify the cavity lengths was investigated by experts in the thin film field.

P. W. Baumeister in a paper entitled "Use of microwave prototype filters to design multilayer dielectric bandpass filters", published in Applied Optics Vol. 21. No. 16, Aug. 15, 1982, describes the use of a standing wave ratio technique to match reflective zones applying microwave filter synthesis.

C. Jacobs in an article entitled "Dielectric square bandpass design", in Applied Optics, Vol. 20, No. 6 Mar. 15, 1981, describes the use of an effective index approach. A. Thelen in a book entitled Design of Optical Interference Coatings, McGraw-Hill Book Company 1989, describes equivalent layers and other schemes to reduce ripple. However, the layer sequences developed from these methods are not considered to be general and do not apply equally well for different ratios of index of refraction of the multi-layers.

Generally, procedures that result in high transmission, reduce the bandwidth of this transmission at the expense of poor slopes (i.e. a slow rate of change) in the transition to blocking. Since the improvement in transmission outweighs the change in slope, additional cavities may be added to a filter to improve the slope.

In view of the limitations of the prior art, it is an object of this invention to provide a bandpass filter that overcomes many of these limitations.

Furthermore, it is an object of this invention to provide a bandpass filter in the form of a multi-layer, multi-cavity structure that reduces transmission ripple in the passband, normally associated with other bandpass filters.

Furthermore, it is an object of this invention to provide a bandpass filter in the form of a multi-layer, multi-cavity structure that reduces transmission ripple in the passband and provides better slopes than those normally associated with other bandpass filter designs with reduced ripple.

SUMMARY OF THE INVENTION

The present invention is comprised of a multilayer film of alternating layers of two (or more) transparent dielectric films with dissimilar indices of refraction. The invention utilizes anti-reflection from the filter structure to the substrate and output interfaces (if necessary) These filters, in accordance with this invention have extra half-waves added to various layers in selected cavities to provide three-quarter wave layers.

Advantageously, the desired result, reduce ripple, is produced with virtually any suitable materials that are transparent in the spectral area of interest.

In accordance with the invention, there is provided a bandpass filter comprising: an array of cavities including two outer cavities and one or more other inner core cavities, each cavity having a plurality of quarter-wave reflecting stacks comprising layers of material of alternating high and low refractive index, said plurality of stacks beings separated by a half wave layer of dielectric material, each cavity being separated by quarter-wave layer of low refractive index material, The improvement consists of adding half-wave layers positioned in the inner cavities adjacent quarter-wave layers to remove ripple induced by the outer cavities.

In accordance with the invention, there is further provided, a multi-layer multi-cavity filter comprising a predetermined a first group of cavities, and a second group of cavities, each cavity having a plurality of quarter wave reflecting stacks comprising layers of material of alternative high and low refractive index being separated by a half-wave or multiple half wave layer of dielectric material, at least one of the stacks in the first group includes an additional half-wave layer is provided in addition to the quarter wave layers for lessening ripple.

In accordance with the invention, there is provided, a bandpass filter having a plurality of cavities including two outer cavities and one or more other inner core cavities, each cavity having two quarter-wave reflecting stacks comprising layers of material of alternating high and low refractive index, said stacks in each cavity being separated by a half wave layer or multiple half wave layer having three or less half waves of dielectric material, each cavity being separated from an adjacent cavity by quarter-wave layer of low refractive index material, wherein some of the quarter-wave reflecting stacks include at least a three quarter-wave layer and wherein three quarter-wave layers present in either of the outer cavities are for altering the slope of the passband, and wherein three quarter-wave layers disposed in the inner cavities are for lessening ripple introduced by any three quarter-wave layers present in any of the outer cavities.

In accordance with this invention, an optical filter is provided, wherein the addition of a half-wave layer to a quarter wave layer of a reflecting stack, changing the effective index of the stack of a cavity provides significant improvement in the reduction of ripple. The following figures illustrate a significant improvement in ripple reduction over standard quarter wave reflecting stacks.

BRIEF DESCRIPTION OF THE DRAWINGS

Exemplary embodiments of the invention will now be described in conjunction with the drawings, in which:

FIG. 1a is a cross sectional view of a prior art bandpass filter ensemble;

FIG. 4 is a cross sectional view of a prior art dielectric filter cavity;

FIG. 4a is a cross sectional view of a dielectric filter cavity in accordance with this invention.

FIG. 5a is a cross sectional view of a prior art multi-cavity filter;

GENERAL INFORMATION ABOUT FILTER CONSTRUCTION

Filters for wavelength division multiplexers and other communication industry applications require very straight slopes with low loss and virtually no ripple. Typical bandwidths range from 0.5 nm to 100 nm for the wavelength range 1250 to 1650 nm. There are many other applications for filters that would benefit from this improvement in technology that is provided by this invention.

FIG. 1a is a diagram illustrating a conventional multi-cavity optical filter.

Figure 2:
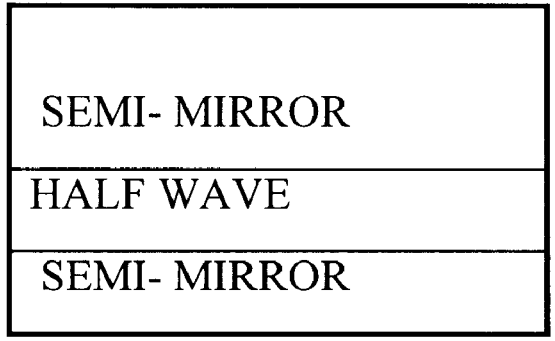
FIG. 2 is a cross sectional view of a solid etalon filter in accordance with the prior art.

The simplest filter, shown in prior art FIG. 2, consists of two partial-reflectors or semi-mirrors separated by a half wave layer of transparent dielectric material (similar to an Etalon).

Figure 3:
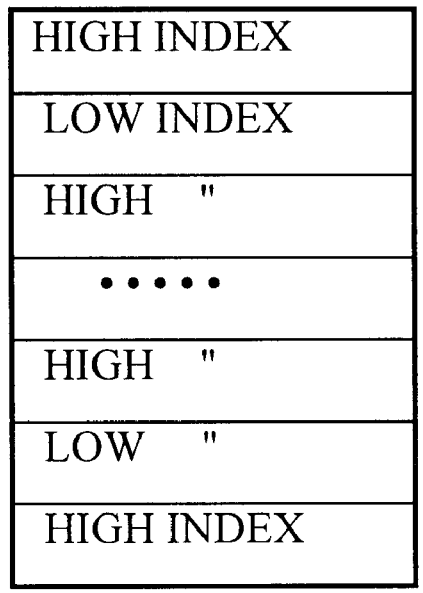
FIG. 3 is a cross sectional view of a prior art quarter wave stack (QWS)

Turning now to FIG. 3, for all-dielectric filters, the partial-reflector shown consists of alternating layers of high and low index materials. The thickness of each layer is adjusted to be a quarter wave (QW) at the wavelength of the desired filter. Each partial-reflector (which may be comprised of only a single layer) is called a quarter-wave stack. The bandwidth of the filter is a function of the reflectance of quarter-wave stacks in the structure.

Referring now to FIG. 4, a filter cavity, one of the most ubiquitous and basic building blocks for all-dielectric interference filters, is shown. The cavity is comprised of two identical reflectors made from quarter-wave stacks separated by a half wave (or multiple half-wave) layer, as is seen in FIG. 4. Cavities are deposited on top of other cavities, with a quarter-wave layer of low index material between, to sharpen the slopes. This produces a multi-cavity filter shown in FIG. 5a.

From a practical point of view, the total number of layers to be deposited controls the number of cavities possible. At 0.3 nm bandwidth and greater, multi-cavity designs are possible. Filters up to 10 nm bandwidth may be made easily with 3 or 4 cavities. For greater than 6 nm, even more cavities may be necessary to achieve the slopes for blocking the transmission of unwanted wavelengths of light. These filters have a large number of layers. Surface area yield is small and 25 mm diameter may be typical for the narrower bands. Equal length cavities produce the best roll-off with the broadest pass-zones, but examination of the graphs for equal cavity filters demonstrates that improvement is needed.

DETAILED DESCRIPTION OF THE INVENTION

Figure 1B:
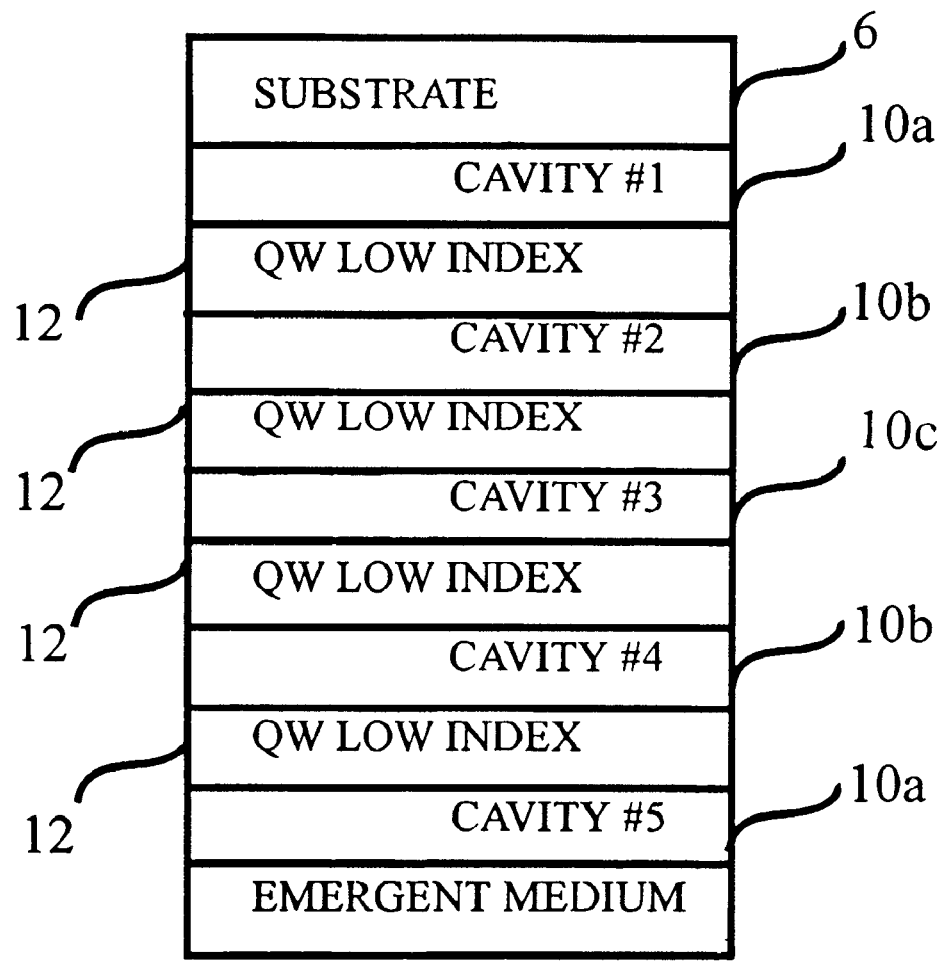
FIG. 1b is a cross sectional view of a bandpass filter ensemble in accordance with the invention.

Referring to FIG. 1b of the invention, generally, the optional matching layer is a low refractive index material having a thickness of a quarter wave. However, material, thickness, and index of refraction of the matching layer(s) may be different from that of the low index material 12. The cavities 10a and 10b and 10c comprise alternating quarter wave thick layers of high and low index materials. Between the cavities is a quarter wave low index (L) material. The first material in a cavity 10a is a quarter-wave high-index (H) material and is followed by a quarter wave of low index (L) material. The structure of the cavity 10a is (HLHHLH); each layer indicating a quarter wave thick high or low index material. Thus, HLHHLH is considered to be a four layer structure, having a half wave layer HH of high refractive index material disposed between two layers HL, each a quarter wave thick of high refractive index material. Next, the low index layer 12 is disposed between each cavity 10a and/or 10b that follows. The next core cavity 10b is of the layer structure HLLL HH LH. Hence, the core cavity 10b is considered to be a five layer structure, having a half wave layer LL added to the low refractive index layer before the spacer layer HH to reduce ripple. A cavity 10c adjacent 10b is of the layer structure HHHL 4H LHHH, wherein the spacer layer is a multiple (2) half-wave layer. The filter is symmetric about the cavity 10c, having cavities 10a, and 10b on both sides of 10c.

The substrate 6 is transparent over the wavelength of interest and may be made from a wide variety of materials including but not limited to glass, quartz, clear plastic, silicon, and germanium. The dielectric materials for this application have indices of refraction in the range 1.3 to greater than 4.0. The preferred materials are Magnesium Fluoride (1.38), Thorium Fluoride (1.47), Cryolith (1.35), Silicon Dioxide (1.46). Aluminum Oxide (1.63), Hafnium Oxide (1.85), Tantalum Pentoxide (2.05). Niobium Oxide (2.19), Zinc Sulphide (2.27), Titanium Oxide (2.37), Silicon (3.5), Germanium (4.0), and Lead Telluride (5.0). Other dielectric materials would serve as well.

After establishing the number of layers in each cavity, in accordance with the teaching of this invention, the design of the filter is easily accomplished with the aid of a commercially available computer program with optimization routines (for example, TFCalc™ by Software Spectra Inc.). Design recipes are entered into the program and a spectral response is calculated. When the design with the proper size cavities is selected to match the required nominal bandwidth, optimization of the filter transmission is performed for the matching layers. A designer selects from a choice of materials to use in a quarter wave match or may choose to use the same low index material with thickness adjustments to accomplish the matching.

The filter of FIG. 1b includes of an array of cavities, each separated by quarter waves of low index material. Additional half-waves are attached to quarter-wave layers in the outer stacks yielding three-quarter wave layers to improve the slope. However, this introduces ripple. Nevertheless when the slope is satisfactory, the ripple is reduced by adding more half waves to quarter-waves in the inner stacks thereby yielding three-quarter wave layers.

FIG. 4a shows a cavity in accordance with the invention wherein extra half wave layers are added to high index quarter wave layers yielding three quarter wave high index layers.

When the general attributes of the filter are satisfactory, the position of the added multiple waves may be tested for angular sensitivity. Altering the positions slightly may provide vastly improved filter properties for a variety of angles of incidence.

The following graphs will illustrate that the transmission response as a function of wavelength is shown wherein ripple is significantly reduced from a same filter absent the extra half wave layers in the inner cavities.

Figure 6:
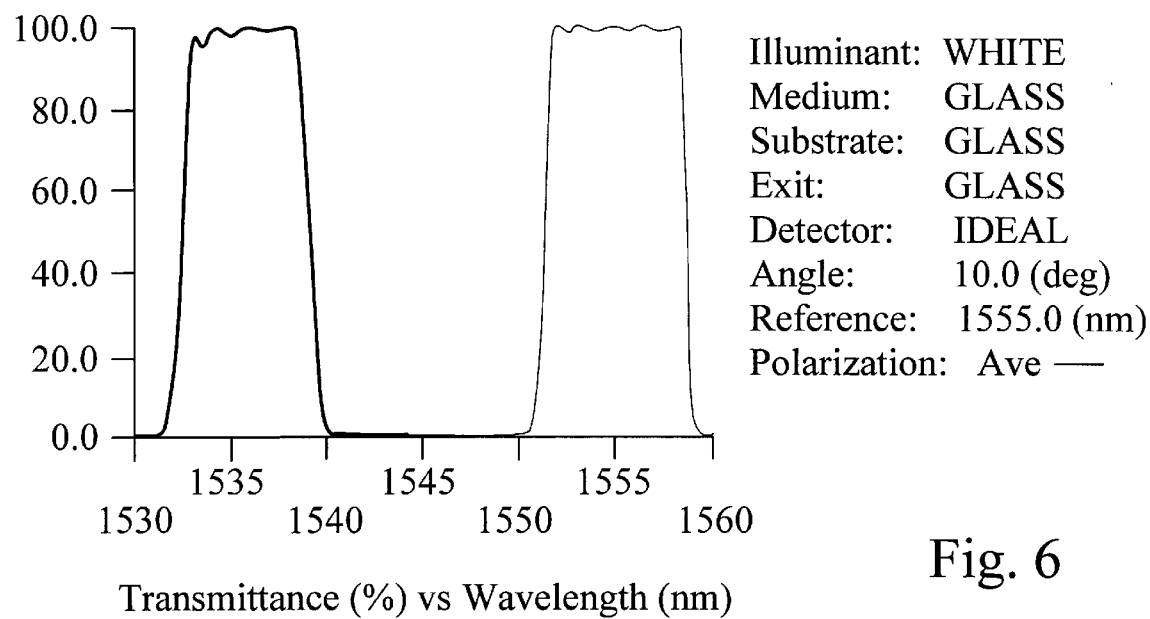
FIG. 6 is a graph of transmittance versus wavelength of a five cavity filter in accordance with this invention (heavy line at 10 degrees incidence) and of the filter (light line at normal incidence)

Referring now to FIG. 6, a response is shown (in heavy outline at 10 degrees incidence) of a five cavity diverse filter with extra half-wave layers added and for a same filter (shown in light outline at normal incidence). As is evident, ripple is significantly low in both of these graphs.

The filter structure with the extra half wave layers is as follows:
(HLHLHL3H2L3HLHLHLH) L (HLHLHLHL 2H LHLHLHLH) L (HLHLHLH 3L 4H LHLHLHLH)L (HLHLHLHL 2H LHLHLHLH) L (HLHLHL3H 2L 3HLHLHLH)

Figure 7:
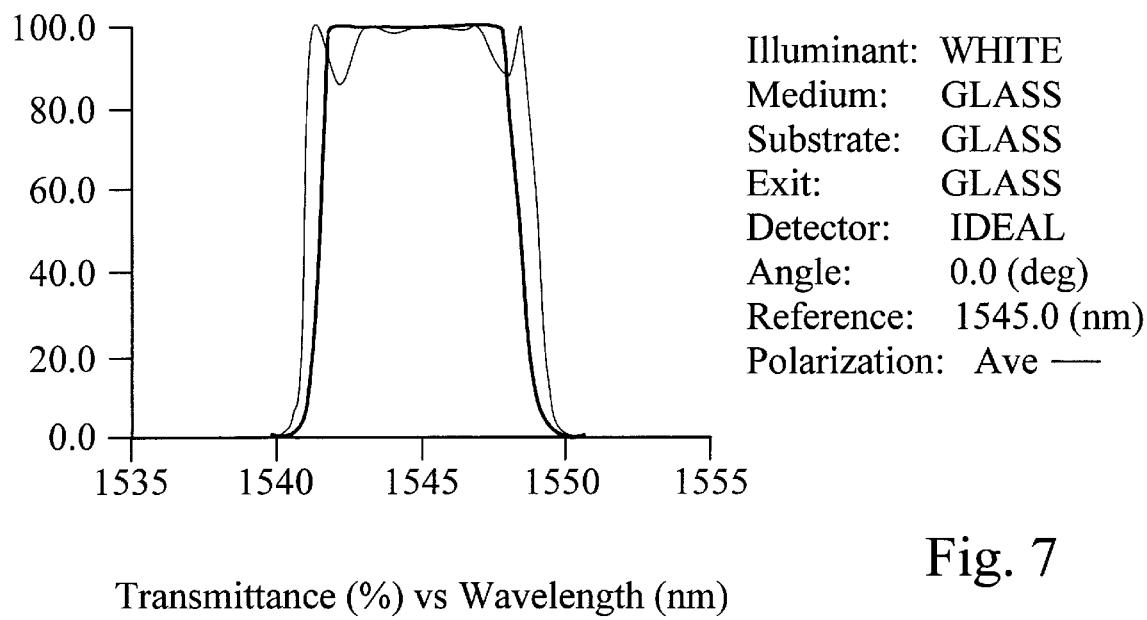
FIG. 7 is a graph of transmittance versus wavelength of a conventional six cavity structure (light line) and for a six cavity filter in accordance with this invention (heavy line;)

In FIG. 7 a six cavity diverse filter is shown wherein the conventional filter (light outline) has excessive ripple. As is evident from the response shown (heavy outline) the ripple is essentially removed by the cavity having the following structure:
(HLHLHLH 2L HLHLHLH) L (HLHLHLHL 2H LHLHLHLH) L (HLHLHLH 3L 2H LHLHLHLH) L (HLHLHLH 3L 2H LHLHLHLH) L (HLHLHLHL 2H LHLHLHLH) L (HLHLHLH 2L HLHLHLH)

Figure 8:
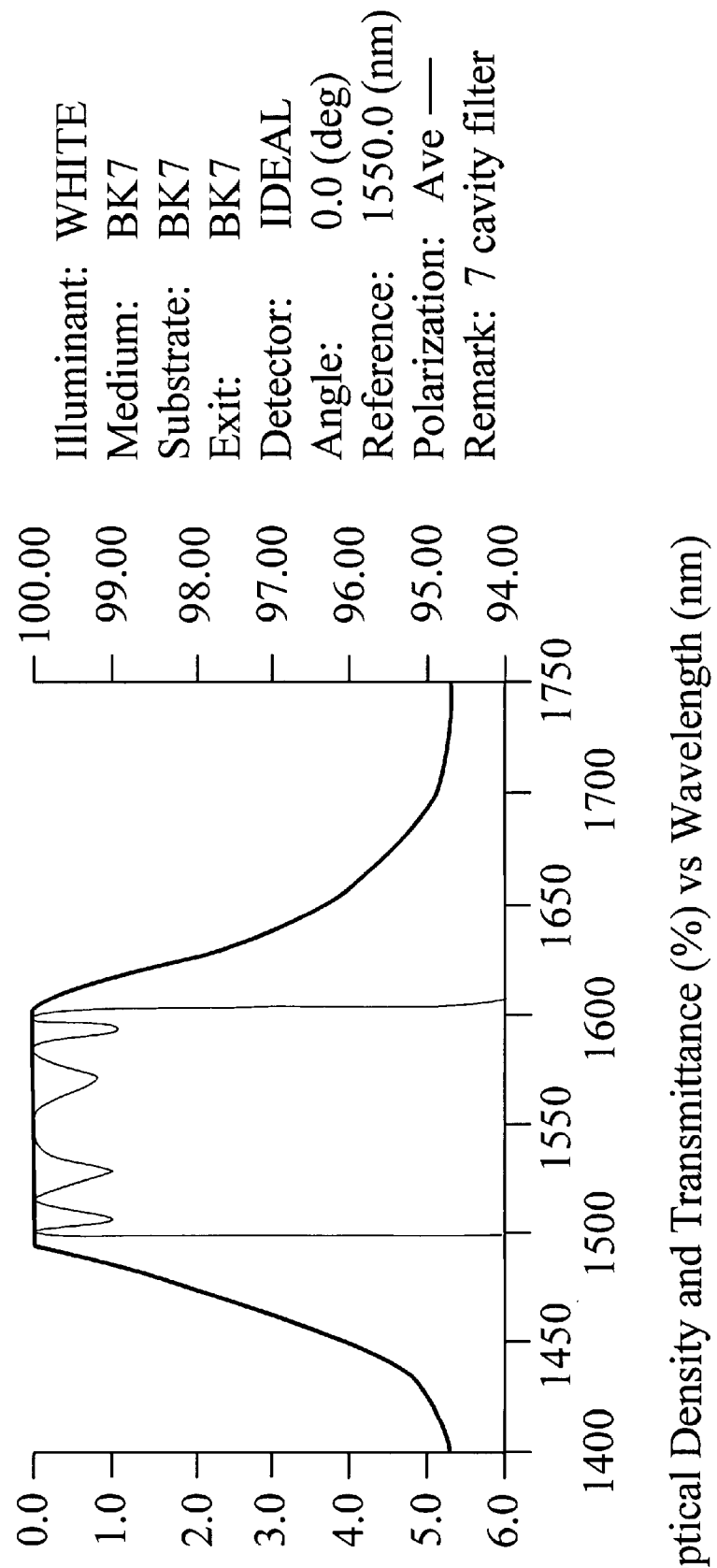
FIG. 8 is a graph of transmittance versus wavelength of a seven cavity filter in accordance with this invention (wherein the heavy line illustrates an optical density logarithmic scale); and, FIG. 9 is a graph of transmittance versus wavelength of three optical four cavity filters, the outer line being for a classical all half wave design, the inner light line, full waves on inner cavities, and the heavy line representing the response of three quarter wave layers and half wave layers on the inner cavities.

FIG. 8 shows the transmission profile of a bandpass filter having seven cavities. Ripple is reduced to approximately 1% or less. The heavy outline shown is a graph of the output response using a logarithmic optical density scale:

The filter's quarter wave layers are arranged as follows: (HL HH LH) L (HLH LL HLH) L (HHHLH LL HLH) L (HHHLH LL HLHHH) L (HLH LL HLHHH) L (HLH LL HLH) L (HL HH LH).

The index of refraction of the substrate and the emergent (or exit) medium will affect the ripple. To reduce ripple to a minimum, it may be necessary to match the filter structure to the emergent medium. For example, when the refractive index n of the emergent medium is between 1.44 and 1.8 a quarter wave layer of the low index material (for a low index material with an index of approximately 1.48 or less) may provide suitable matching. For indices of refraction greater than approximately 1.8 or less than approximately 1.44, layer changes are necessary between the medium and the filter. This particular problem is well known and has been addressed by those proficient in the art. FIG. 8 demonstrates the effect of matching a filter with an exit medium. For any substrates and exit mediums structure changes next to the mediums enhance the performance of the filter such that the indices of the substrate and output medium are not obstacles.

Figure 9:
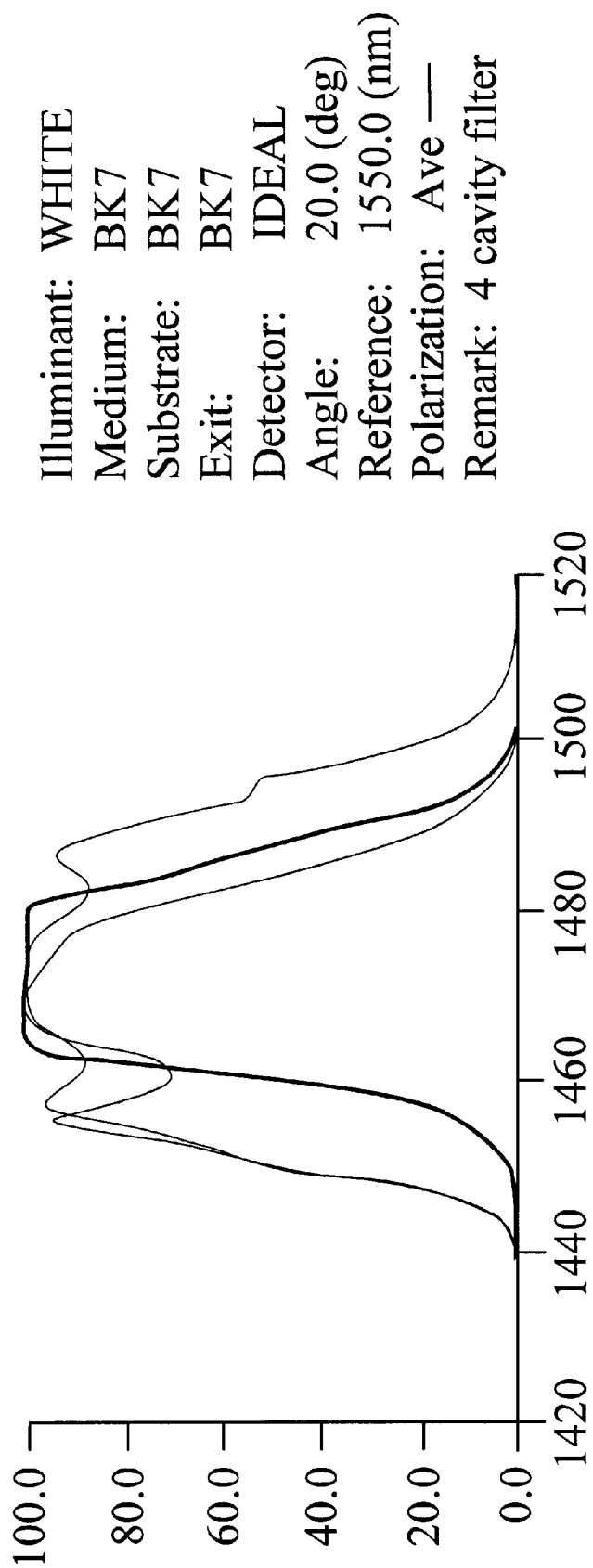

FIG. 9 shows a graph of three output responses at 20 degrees for three four-cavity filters having different inner cavity layer structure. In FIG. 9 the light outer line depicts the response for a classical 4 cavity filter of the form (HLHLH LL HLHLHL)4. The inner light line shows a modification to the classical filter as taught by Thelen wherein a full wave layer is used on the inner cavities. It is noted however, that these responses are not desirable and significant ripple is shown as present at 20 degrees angle of incidence. The response illustrated by the heavy line in the figure shown a significant improvement, wherein three-quarter wave layers and full wave layers are used in the inner cavities. The form of this filter in accordance with an embodiment of this invention is as follows:
(HLHLH LL HLHLHL) (HLHL 3H 4L HLHLHL) (HLHL 3H 4L HLHLHL) (HLHLH LL HLHLHL).

Of course numerous other embodiments and applications may be envisaged, without departing from the spirit and scope of the invention.

What is claimed is:

1. A multi-layer multi-cavity filter comprising an array of at least n cavities, each of the n cavities having two quarter wave reflecting stacks each comprising layers of material of alternative high and low refractive index, the two quarter wave reflecting stacks being separated by a half wave or multiple half wave spacer layer of dielectric material, the array of at least n cavities having at least one or more inner cavities and one or more outer cavities adjacent a substrate and one or more outer cavities adjacent an outward medium, each of the n cavities separated by a quarter wave layer of low refractive index material, wherein at least an additional half-wave layer is provided in addition to the quarter wave layers of one or more stacks of one or more of the inner cavities to yield at least a three-quarter wave layer within said one or more of the stacks for lessening ripple, the at least n cavities consisting of an equal number of layers, or alternatively, the at least one or more inner cavities consisting of an equal number of layers and outermost cavities of the outer cavities having two less layers.

2. A multi-layer multi-cavity filter as defined in claim 1, wherein at least an additional half-wave layer is provided in addition to the quarter wave layers of two or more stacks of one or more cavities for lessening ripple.

3. A multi-layer multi-cavity filter as defined in claim 1, wherein at least an additional half-wave layer is provided in addition to the quarter wave layers of two or more stacks of at least two cavities for lessening ripple.

4. A multi-layer multi-cavity filter comprising a first group of inner cavities, and a second group of outer cavities, each cavity having a plurality of quarter wave reflecting stacks, each of the reflecting stacks comprising layers of material of alternative high and low refractive index being separated by a half-wave or multiple half wave layer of dielectric material, wherein at least one of the stacks in the first group of inner cavities includes an additional half-wave layer provided in addition to one of the quarter wave layers for lessening ripple, the half-wave layer and its adjacent quarter wave layer forming a three-quarter wave layer of material having a same refractive index.

5. A multi-layer multi-cavity filter as defined in claim 4, wherein the second group includes the same number of cavities as the first group.

6. A multi-layer multi-cavity filter as defined in claim 4, wherein the second group of cavities includes an additional half-wave layer provided in addition to the quarter wave layers for lessening ripple.

7. A multi-layer multi-cavity filter as defined in claim 6, wherein the second group of cavities are outer cavities, the outer cavities having reflecting stacks the reflecting stacks having an additional half-wave layer provided in addition to the quarter wave layers for increasing the slope of the filter.

8. A bandpass filter having a plurality of cavities including two outer cavities and one or more other inner core cavities, each cavity having two quarter-wave reflecting stacks, each of the quarter-wave reflecting stacks comprising layers of material of alternating high and low refractive index, said stacks in each cavity being separated by a half wave layer or multiple half wave layer having three or less half waves of dielectric material, each cavity being separated from an adjacent cavity by quarter-wave layer of low refractive index material, wherein some of the quarter-wave reflecting stacks include at least a three quarter-wave layer and wherein three quarter-wave layers present in either of the outer cavities are for altering the slope of the passband, and wherein three quarter-wave layers disposed in the inner cavities are for lessening ripple introduced by any three quarter-wave layers present in any of the outer cavities.

9. A bandpass filter as defined in claim 8 wherein the one or more inner core cavities have at least a three quarter wave layer in at least one of the reflecting stacks.

* * * * *